June 9, 1959 — S. NOODLEMAN — 2,890,356

MAGNETIC CLUTCH

Original Filed April 5, 1954

INVENTOR.
SAMUEL NOODLEMAN
BY Dybvig and Jacox
HIS ATTORNEYS

United States Patent Office 2,890,356
Patented June 9, 1959

2,890,356

MAGNETIC CLUTCH

Samuel Noodleman, Dayton, Ohio, assignor, by mesne assignments, to The Standard Dayton Corporation, Dayton, Ohio, a corporation of Ohio Original application April 5, 1954, Serial No. 420,935, now Patent No. 2,828,457, dated March 25, 1958. Divided and this application June 3, 1957, Serial No. 664,874

7 Claims. (Cl. 310—105)

This invention relates to electromagnetic machinery and more particularly to magnetic clutches. This invention relates to my invention disclosed in Patent No. 2,627,059.

This is a division of my co-pending application Serial No. 420,935, now Patent No. 2,828,457.

An object of the invention is to provide an electric clutch having positive locking characteristics.

Other objects and advantages reside in the construction of parts, the combination thereof and the mode of operation, as will become more apparent from the following description.

It has been found in an alternating current electric machine that a locking effect can be produced between two relatively rotatable concentric magnetic members if one of the members has at least a single-phase winding and the other magnetizable member has a plurality of groups of elongate conductor bars.

In the drawings, Figure 1 shows a clutch of this invention having concentric relatively rotatable magnetic members in which both the outer and inner magnetic members are rotatable.

A machine of this invention comprises an outer magnetizable member and an inner magnetizable member concentric therewith, the members having means for relative rotation therebetween.

Figure 1:
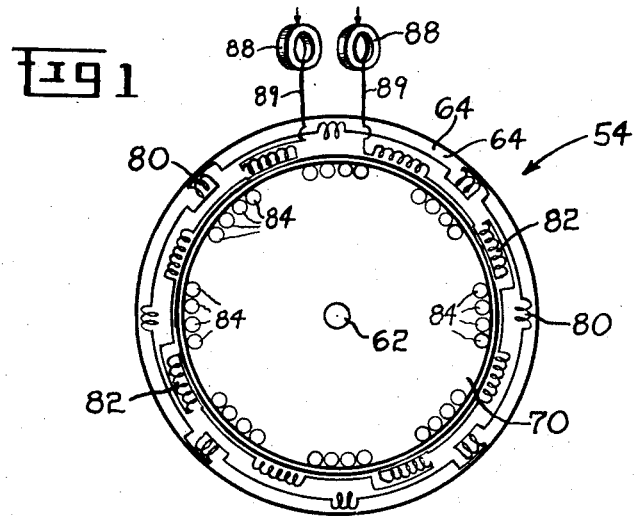
Figure 2:
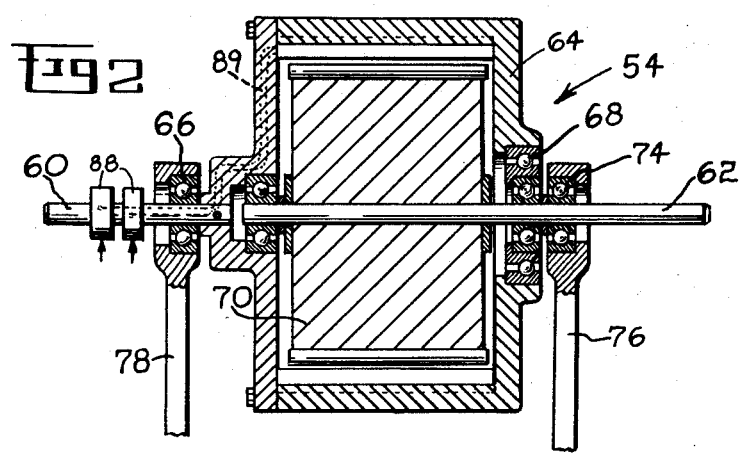
Figure 2 is a side sectional view of the machine of Figure 1 made according to this invention.

For purposes of illustration a clutch made according to this invention is indicated generally by reference numeral 54 and is shown in Figures 1 and 2. The clutch 54 is provided with two independently rotatable shafts 60 and 62. The shaft 60 may be coupled to a driving member and a shaft 62 may be attached to a driven member or the shaft 60 may be coupled to a driven member and the shaft 62 to the driving member. An outer rotor 64, attached to the shaft 60, is rotatably supported in anti-friction bearings 66 and 68. An inner rotor 70 is attached to the shaft 62 and is rotatably supported in anti-friction bearings 62 and 74. Bearing 68 is a double bearing and is supported by the shaft 62 and the bearing 72 is supported within the outer rotor member 64, as shown in Figure 2. The bearings 66 and 74 are supported by bearing pedestal members 76 and 78.

The outer rotor member 64 is provided with a pair of windings 80 and 82. These windings 80 and 82 are electrically angularly displaced. Winding 80 is a shorted winding and winding 82 is an energizing winding. The outer rotor member 64 is similar to a conventional stator; however, due to the fact that it is rotatably mounted, it is herein termed the outer rotor. The inner rotor member 70 may be similar to a conventional induction motor rotor, except that as is disclosed in Figure 1, conductor bars are only provided around a portion of the periphery.

The conductor bars are herein shown as conductor bars 84. The conductor bars 84 are positioned in groups, each group having an equal number of conductor bars and the groups being spaced substantially an equal distance apart around the periphery of the inner rotor 70. The groups of rotor conductor bars 84 are herein shown as having four conductor bars 84 in each group. However, any suitable number of conductor bars might be used. It is noted that the number of conductor bar groups is equal to the number of poles of the energizing winding 82; however, satisfactory operation may be obtained using a number of groups of bars different from the number of magnetic poles.

Electrical energy for energizing the winding 82 is provided through a pair of slip rings 88. The slip rings 88 are shown positioned on the shaft 60 beyond the bearing 66. However, the slip rings may be positioned on the shaft 60 between the bearing 66 and the outer rotor member 64. Wires 89 connect from the slip rings 88 to the winding 82.

As stated above, either the shaft 60 or the shaft 62 may be connected to a driving member while the other shaft is connected to a driven member. When it is desired to "clutch in" to drive the driven member at the speed of the driving member, a single-phase alternating current voltage is supplied to the slip rings 88 which energizes the energizing winding 82. When this energization occurs, voltage is induced in the shorted winding 80 which causes the outer rotor 64 and inner rotor 70 to approach the same speed and the energizing winding 82 causes the groups of conductor bars 84 to align themselves between the magnetic poles established by the energizing winding 82. The inner rotor member 70 is thus electrically locked with the outer rotor member 64 and the locking position is as shown in Figure 1, in which each of the groups of conductor bars 84 is positioned between two adjacent magnetic poles of the energizing winding 82. The speed of a driven member attached to one of the shafts thus becomes equal to the speed of the driving member attached to the other shaft.

Figure 3:
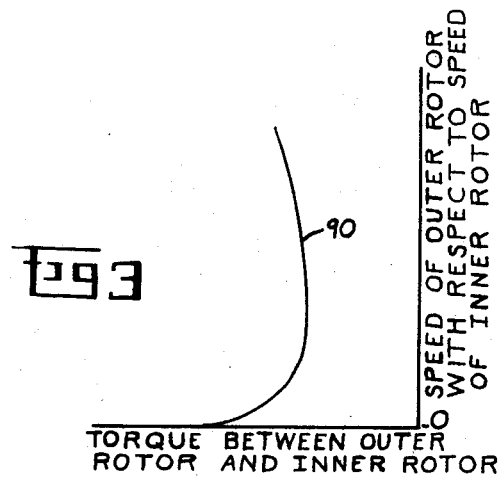
Figure 3 is a speed-torque curve illustrative of the operation of an electric clutch of this invention.

Figure 3 shows a speed torque curve 90 illustrating the operation of a typical positive locking clutch made according to this invention. It is noted in Figure 3 that, as the speed of the outer rotor member with respect to the speed of the inner rotor member approaches zero, the torque between the outer rotor member 64 and the inner rotor member 70 increases. The exact shape of such a curve is determined by various factors, among which are the arrangement and resistances of the rotor conductor bars. Naturally, it is understood that when the speed of the outer rotor member with respect to the speed of the inner rotor member is zero, the inner rotor member is rotating at the same speed as the outer rotor member. When it is desired to release the driven member from clutched engagement with the driving member, all that is necessary is to de-energize the energizing winding 82 by removal of the voltage applied across slip rings 88.

Any device made according to this invention may be provided with a three-phase winding or with any other polyphase winding, or with a single-phase winding.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention I claim:

1. In a positive locking mechanism, a pair of concentric members having relative rotary movement, one of said concentric members being provided with a two-phase winding, one phase of the two-phase winding being shorted, the other of said concentric members including a plurality of groups of elongate conductor members.

2. In a clutch mechanism, a pair of concentric rotatable members having relative rotary movement, one of said rotatable members being a driven member and the other of said rotatable members being a driving member, one of said members including a control winding having a given number of magnetic poles and a shorted winding, the other of said members including a magnetic core provided with a plurality of conductor slots adjacent the periphery thereof, and a plurality of groups of conductor bars positioned in the conductor slots, the number of groups of conductor bars being substantially equal to the number of poles of the control winding.

3. In a locking mechanism, an outer and an inner concentric member, the concentric members having relative rotary movement, the outer of said concentric members being provided with a two-phase winding, one phase of the two-phase winding being shorted, the inner of said concentric members including a plurality of groups of conductor bar members, all of the groups of conductor bar members comprising substantially an equal number of conductor bars.

4. In a locking mechanism, an outer and an inner concentric member, the concentric members having relative rotary movement, the outer of said concentric members being provided with a two-phase winding, means for shorting one phase of the two-phase winding, means for electrically connecting the other phase of the two-phase winding to a source of electrical energy, the inner of said concentric members including a plurality of groups of conductor bar members.

5. An electric machine comprising an inner rotary member, an outer rotary member, the rotary members being concentric, one of the rotary members having a first winding and a second winding, the first and second windings being arranged so that the poles established by one of the windings are electrically angularly disposed with respect to the poles of the other winding, means for shorting one of the windings, means for connecting the other winding to a source of electrical energy, the other rotary member including a plurality of groups of elongate conductor members.

6. An electric machine comprising a pair of concentric members having relative rotary movement, one of the concentric members having a first winding and a second winding, the first and second windings being arranged so that the poles established by one winding are electrically angularly disposed with respect to the other winding, means for shorting one of the windings, means for connecting the other winding to a source of electrical energy, the other concentric member including a plurality of groups of elongate conductor members.

7. An electric machine comprising an inner rotor provided with a plurality of conductor bars, the conductor bars being positioned in groups, all of the conductor bars in each group having substantially the same resistance value, an outer rotor, the outer rotor including a first multipolar winding and a second multipolar winding, the first winding and the second winding being disposed so that the poles of one winding are in electrical angular relationship with respect to the poles of the other winding, means for shorting the first winding, and means for connection of the second winding to a source of electrical energy.

No references cited.